United States Patent
Kawaguchi

(10) Patent No.: US 10,416,023 B2
(45) Date of Patent: Sep. 17, 2019

(54) LIQUID SURFACE LEVEL SENSOR

(71) Applicant: Yazaki Corporation, Tokyo (JP)

(72) Inventor: Yasunori Kawaguchi, Shizuoka (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 15/911,538

(22) Filed: Mar. 5, 2018

(65) Prior Publication Data
US 2018/0340814 A1 Nov. 29, 2018

(30) Foreign Application Priority Data

May 25, 2017 (JP) ................................. 2017-103333

(51) Int. Cl.
*G01F 23/38* (2006.01)
*B60K 15/03* (2006.01)

(52) U.S. Cl.
CPC .............. *G01F 23/38* (2013.01); *B60K 15/03* (2013.01); *B60K 2015/03217* (2013.01)

(58) Field of Classification Search
CPC .......... G01F 23/38; G01F 23/32; G01F 23/36; G01F 23/34; G01F 23/54; G01F 23/72
See application file for complete search history.

(56) References Cited

U.S. PATENT DOCUMENTS

| | | | | |
|---|---|---|---|---|
| 4,229,973 A * | 10/1980 | Hara | ........................ | G01F 23/32 73/317 |
| 6,166,630 A * | 12/2000 | King | .................... | G01F 23/0069 250/577 |
| 6,401,533 B1 * | 6/2002 | Gier | ..................... | B60K 15/077 73/313 |
| 6,453,741 B1 * | 9/2002 | Beck, II | ................... | G01F 23/38 340/623 |
| 6,564,632 B2 * | 5/2003 | Ross, Jr. | .................. | G01F 23/34 73/290 R |
| 6,679,116 B2 * | 1/2004 | Ross, Jr. | .................. | G01F 23/34 73/290 R |
| 6,851,315 B2 * | 2/2005 | Bergsma | ............... | G01F 23/363 73/290 R |
| 6,976,394 B2 * | 12/2005 | Kleinen | .................. | G01F 23/38 116/227 |

(Continued)

FOREIGN PATENT DOCUMENTS

JP          5225128 B2          7/2013

*Primary Examiner* — David A Rogers
(74) *Attorney, Agent, or Firm* — Sughrue Mion, PLLC

(57) ABSTRACT

A liquid surface level sensor includes a housing, a float located on a liquid surface, a magnet that rotates in accordance with up-and-down movement of the float, an arm joined with the float and the magnet, and a circuit unit. The circuit unit includes a sensing element that detects rotation of the magnet, and a wireless communication circuit that outputs a liquid surface level detected by the sensing element to a device installed in a vehicle. The circuit unit includes generating element that generate electric power from a change in magnetic flux caused by the rotation of the magnet, and a generation circuit that supplies electric power generated by the generating element to the sensing element and the wireless communication circuit as drive electric power. The circuit unit is included inside the housing in a state isolated from the outside.

3 Claims, 5 Drawing Sheets

(56) References Cited

U.S. PATENT DOCUMENTS

| | | | | |
|---|---|---|---|---|
| 7,021,139 B2* | 4/2006 | Fukuhara | G01F 23/38 | 73/290 R |
| 7,093,485 B2* | 8/2006 | Newman | G01F 23/32 | 73/317 |
| 7,165,450 B2* | 1/2007 | Jamnia | G01F 23/38 | 73/317 |
| 7,201,052 B2* | 4/2007 | Lee | G01F 23/38 | 73/317 |
| 7,222,530 B2* | 5/2007 | Fukuhara | G01F 23/38 | 73/317 |
| 7,225,672 B2* | 6/2007 | Tanaka | G01F 23/38 | 73/313 |
| 7,331,225 B2* | 2/2008 | Fukuhara | G01F 23/38 | 73/317 |
| 7,377,163 B2* | 5/2008 | Miyagawa | G01F 23/38 | 73/305 |
| 7,458,261 B2* | 12/2008 | Miyagawa | G01F 23/363 | 73/290 R |
| 7,673,509 B2* | 3/2010 | Cochran | G01F 23/38 | 73/311 |
| 7,719,258 B2* | 5/2010 | Chen | G01R 15/202 | 324/117 H |
| 8,015,871 B2* | 9/2011 | Sohn | G01F 23/38 | 340/625 |
| 8,136,396 B2* | 3/2012 | Mundo | G01F 23/38 | 73/317 |
| 8,671,750 B2* | 3/2014 | Fukuhara | G01F 23/38 | 73/314 |
| 9,453,756 B2* | 9/2016 | Ogasawara | G01F 23/38 | |
| 9,772,212 B2* | 9/2017 | Manabe | G01F 23/38 | |
| 9,772,213 B2* | 9/2017 | Ikeya | G01F 23/38 | |
| 9,772,214 B2* | 9/2017 | Ikeya | G01F 23/38 | |
| 9,885,598 B2* | 2/2018 | Tesar | G01F 23/38 | |
| 2002/0011837 A1* | 1/2002 | Sato | G01D 5/145 | 324/207.2 |
| 2004/0003660 A1* | 1/2004 | Fukuhara | G01F 23/38 | 73/319 |
| 2004/0163467 A1* | 8/2004 | Tanaka | G01F 23/38 | 73/313 |
| 2004/0182150 A1* | 9/2004 | Okada | G01F 23/36 | 73/313 |
| 2004/0231416 A1* | 11/2004 | Kumagai | G01F 23/38 | 73/313 |
| 2005/0103103 A1* | 5/2005 | Newman | G01F 23/32 | 73/313 |
| 2005/0139003 A1* | 6/2005 | Cochran | G01F 23/363 | 73/313 |
| 2005/0146323 A1* | 7/2005 | Kleinen | G01F 23/38 | 324/207.26 |
| 2005/0247124 A1* | 11/2005 | Fukuhara | G01F 23/38 | 73/290 R |
| 2005/0247128 A1* | 11/2005 | Fukuhara | G01F 23/38 | 73/313 |
| 2006/0016256 A1* | 1/2006 | Bauerle | G01F 23/36 | 73/313 |
| 2006/0048571 A1* | 3/2006 | Lee | G01F 23/38 | 73/313 |
| 2006/0272405 A1* | 12/2006 | Feher | G01F 23/38 | 73/313 |
| 2007/0290681 A1* | 12/2007 | Yasuda | G01F 23/38 | 324/207.25 |
| 2008/0202231 A1* | 8/2008 | Sohn | G01F 23/38 | 73/317 |
| 2008/0231267 A1* | 9/2008 | Miyagawa | G01F 23/38 | 324/207.25 |
| 2010/0011890 A1* | 1/2010 | Tseng | F16H 31/001 | 74/143 |
| 2010/0084928 A1* | 4/2010 | Yoshida | H02K 35/02 | 310/15 |
| 2010/0223993 A1* | 9/2010 | Shimizu | G01F 23/36 | 73/317 |
| 2011/0000295 A1* | 1/2011 | Kritlow | G01F 23/18 | 73/299 |
| 2011/0016970 A1* | 1/2011 | Sakamaki | G01F 23/363 | 73/317 |
| 2011/0036165 A1* | 2/2011 | Fukuhara | G01F 23/38 | 73/317 |
| 2012/0011931 A1* | 1/2012 | Ichisawa | G01F 23/38 | 73/317 |
| 2012/0111108 A1* | 5/2012 | Hashimoto | G01F 23/363 | 73/317 |
| 2013/0055807 A1* | 3/2013 | Cochran | G01F 23/363 | 73/313 |
| 2013/0146604 A1* | 6/2013 | Moreno | G01F 23/38 | 220/562 |
| 2014/0116131 A1* | 5/2014 | Forgue | G01F 23/38 | 73/313 |
| 2015/0107355 A1* | 4/2015 | Iryo | G01F 23/72 | 73/313 |
| 2015/0260564 A1* | 9/2015 | Kato | G01F 23/38 | 73/313 |
| 2015/0338263 A1* | 11/2015 | Iryo | G01F 23/38 | 73/317 |
| 2015/0346018 A1* | 12/2015 | M | G01F 23/38 | 73/314 |
| 2015/0362356 A1* | 12/2015 | Fukuhara | G01F 23/38 | 73/314 |
| 2015/0377688 A1* | 12/2015 | Fukuhara | G01F 23/38 | 73/313 |
| 2016/0161321 A1* | 6/2016 | Miyagawa | G01F 23/38 | 73/317 |

* cited by examiner

LIQUID SURFACE LEVEL SENSOR

CROSS-REFERENCE TO RELATED APPLICATION(S)

The present application claims priority to and incorporates by reference the entire contents of Japanese Patent Application No. 2017-103333 filed in Japan on May 25, 2017.

BACKGROUND OF THE INVENTION

1. Field of the Invention

The present invention relates to a liquid surface level sensor.

2. Description of the Related Art

Liquid surface level sensors that detect a liquid surface level have been known. Liquid surface level sensors are used for, for example, detecting a fuel surface level in a fuel tank of automobiles. Japanese Patent No. 5225128 discloses a liquid surface level sensor that detects a fuel surface level by using a magnet mounted to a housing.

The liquid surface level sensor above includes a float located on a liquid surface due to buoyancy and a housing including elements and circuits. The float moves up and down as the liquid surface level changes, and the magnet that is rotatably mounted to the housing rotates in accordance with the up-and-down movement of the float. As the magnet rotates, the magnetic flux around the magnet changes and this change is detected by a sensing element inside the housing as a liquid surface level. The liquid surface level detected by the sensing element is displayed on an electronic device disposed external to the fuel tank, such as on an instrument panel at the driver's seat, as a fuel residual amount.

The sensing element of the liquid surface level sensor above is electrically connected to a power source and electronic devices disposed external to the fuel tank. This configuration requires electrical wires that electrically connect, through the fuel tank, the sensing element with the power source and the electronic devices disposed external to the fuel tank. These wires are routed from the outside to the inside of the housing of the liquid surface level sensor.

In the liquid surface level sensor, routing the wires from the outside to the inside of the housing creates a boundary between the wires and the housing. To prevent fuel in the fuel tank from entering the housing through the boundary between the wires and the housing, the liquid surface level sensor may include, for example, a molded member for sealing the boundary between the wires and the housing. However, the molded member used for sealing the boundary may deteriorate after long-time exposure to the fuel and may have a smaller adhesion strength to the boundary surface because of the effects of thermal expansion and contraction, which results in a gap between the molded member and the wires.

If the fuel in the fuel tank enters the housing through the boundary or the gap and adheres to the elements such as the sensing element and the circuits disposed inside the housing, the performance of the elements and the circuits may be adversely affected. In particular, in consideration of recent environmental problems, alcohol fuels such as ethanol fuel are used instead of fossil fuels. Alcohol tends to absorb water. Alcohol fuel containing water has electrolytic properties. If such alcoholic fuel adheres to metal portions of the elements and the circuits, galvanic corrosion occurs between dissimilar metals, or the metal portions are electrolytically corroded by the application of voltage.

SUMMARY OF THE INVENTION

The present invention has been made in view of the foregoing, and it is an object of the present invention to provide a liquid surface level sensor that can be unaffected by fuel.

In order to achieve the above mentioned object, a liquid surface level sensor according to one aspect of the present invention includes a housing disposed inside a container that stores liquid in the container; a float located on a liquid surface of the liquid due to buoyancy; a magnet rotatably mounted outside the housing; an arm having a first end and a second end, the first end being joined with the float, the second end being joined with the magnet, the arm converting up-and-down movement of the float that occurs in accordance with a change in the liquid surface into rotation of the magnet; and a circuit unit included inside the housing in a state isolated from the outside, the circuit unit being configured to detect a liquid surface level of the liquid, wherein the circuit unit includes a generating element that generates electric power based on a change in magnetic flux caused by the rotation of the magnet in accordance with the change in the liquid surface, a sensing circuit including a sensing element that outputs an electric signal based on a rotation angle of the magnet in the rotation of the magnet in accordance with the change in the liquid surface, the sensing circuit detecting the electric signal output from the sensing element as the liquid surface level, a wireless communication circuit that transmits the liquid surface level detected by the sensing circuit to a transmission target external to the container by wireless communication, and a generation circuit that supplies electric power generated by the generating element to the sensing circuit and the wireless communication circuit.

According to another aspect of the present invention, in the liquid surface level sensor, it is possible to configure that the circuit unit includes an electric storage unit electrically connected to the generating element via the generation circuit, the electric storage unit stores electric power generated by the generating element in accordance with the change in the liquid surface, and the generation circuit supplies the electric power stored in the electric storage unit to the sensing circuit and the wireless communication circuit in accordance with a generation state of the generating element.

According to another aspect of the present invention, in the liquid surface level sensor, it is possible to configure that the liquid surface level sensor is installed in a vehicle, the wireless communication circuit receives stop information relating to a stopping state of the vehicle from the transmission target, and the generation circuit limits electric power supply from the electric storage unit to the sensing circuit and the wireless communication circuit in accordance with the stop information received by the wireless communication circuit.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENT

The following fully describes an embodiment of a liquid surface level sensor according to the present invention with reference to the accompanying drawings. The embodiment is not intended to limit the scope of the present invention. The embodiment described below includes components that can be easily thought of by those skilled in the art or components that are substantially the same. Various omissions, substitutions, and changes in the components may be made without departing from the spirit or scope of the present invention.

Embodiment

Figure 1:
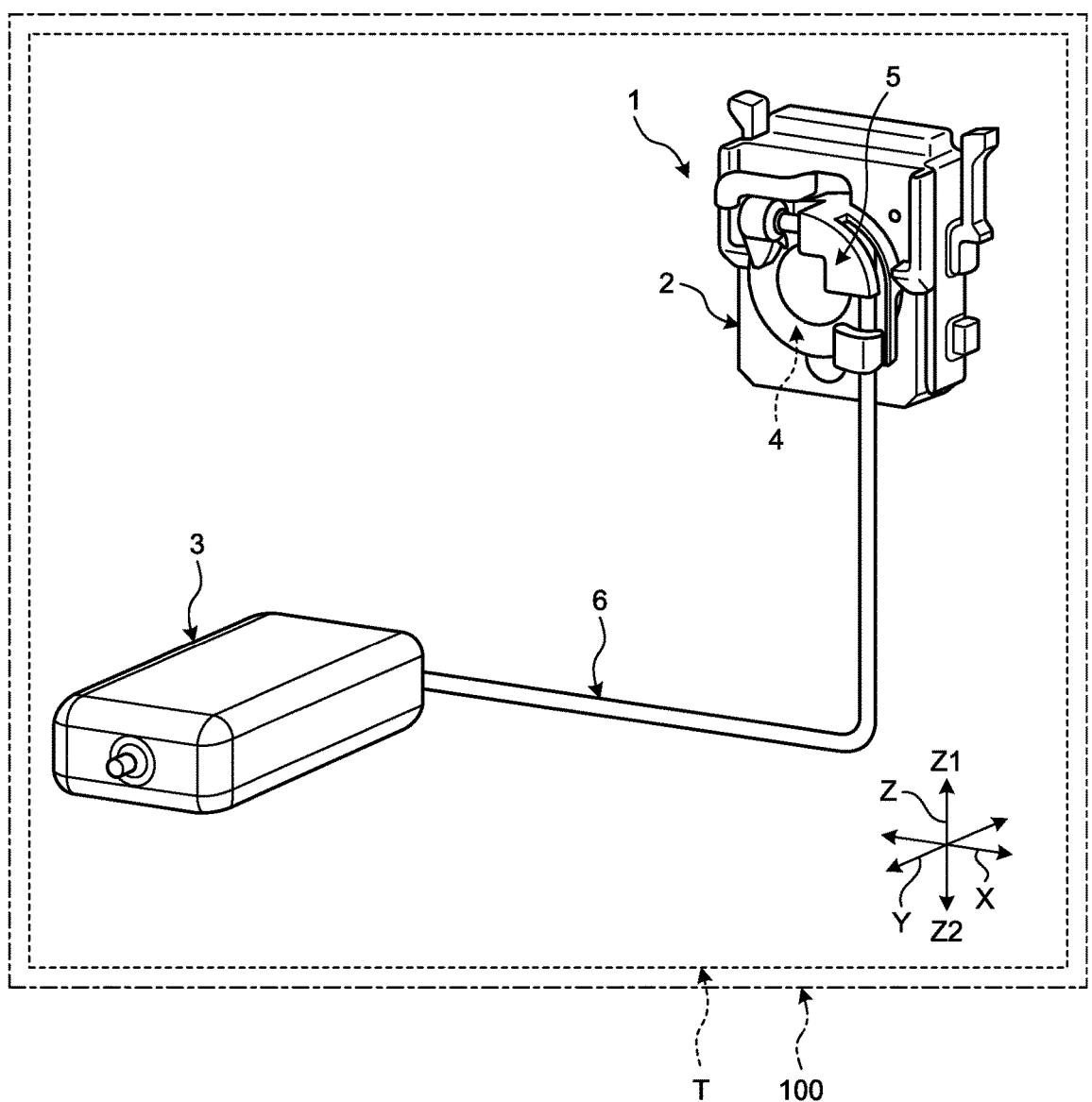
FIG. 1 is a schematic perspective view of a liquid surface level sensor according to an embodiment of the present invention.
Figure 2:
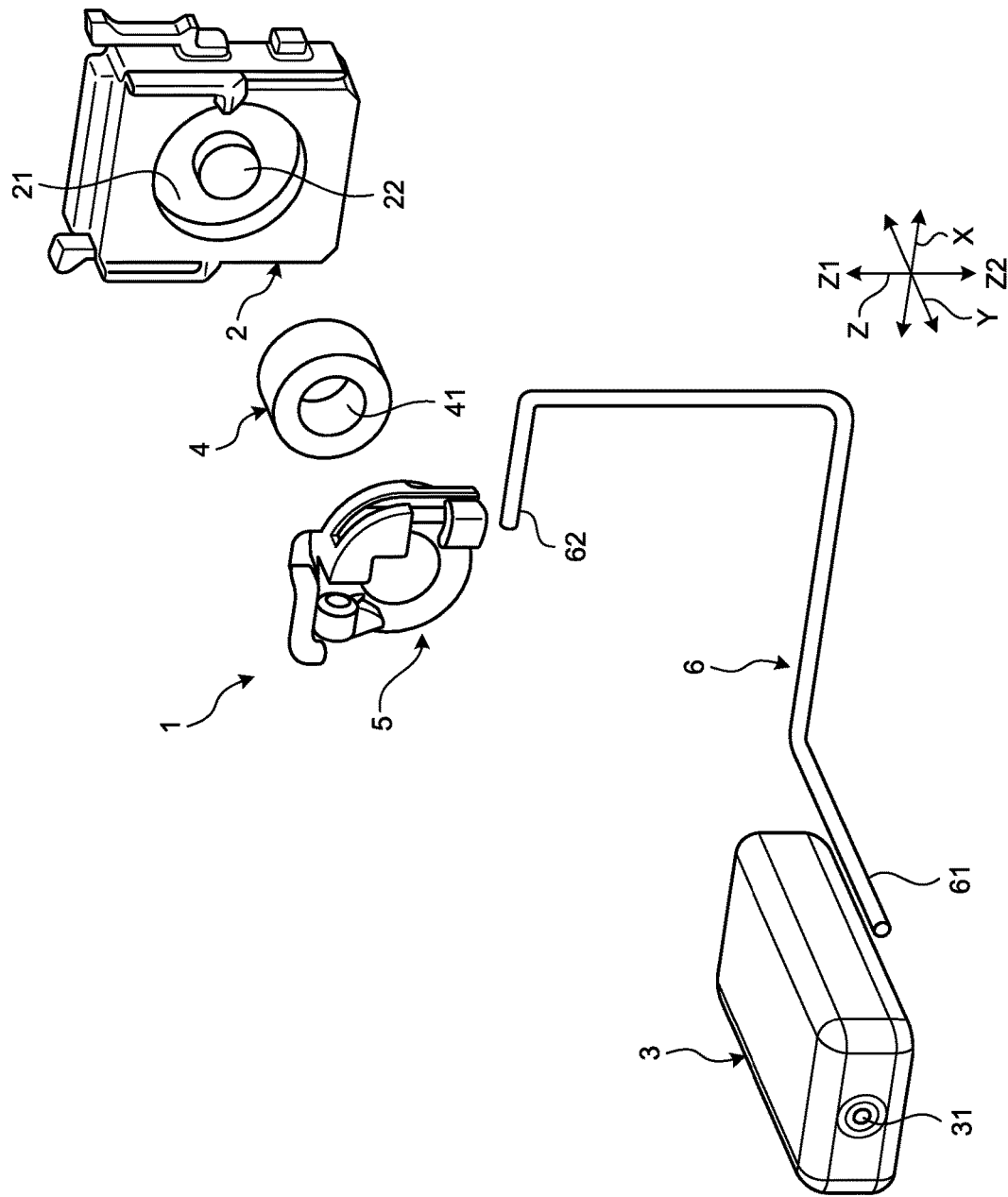
FIG. 2 is a schematic exploded view of the liquid surface level sensor according to the embodiment.
Figure 3:
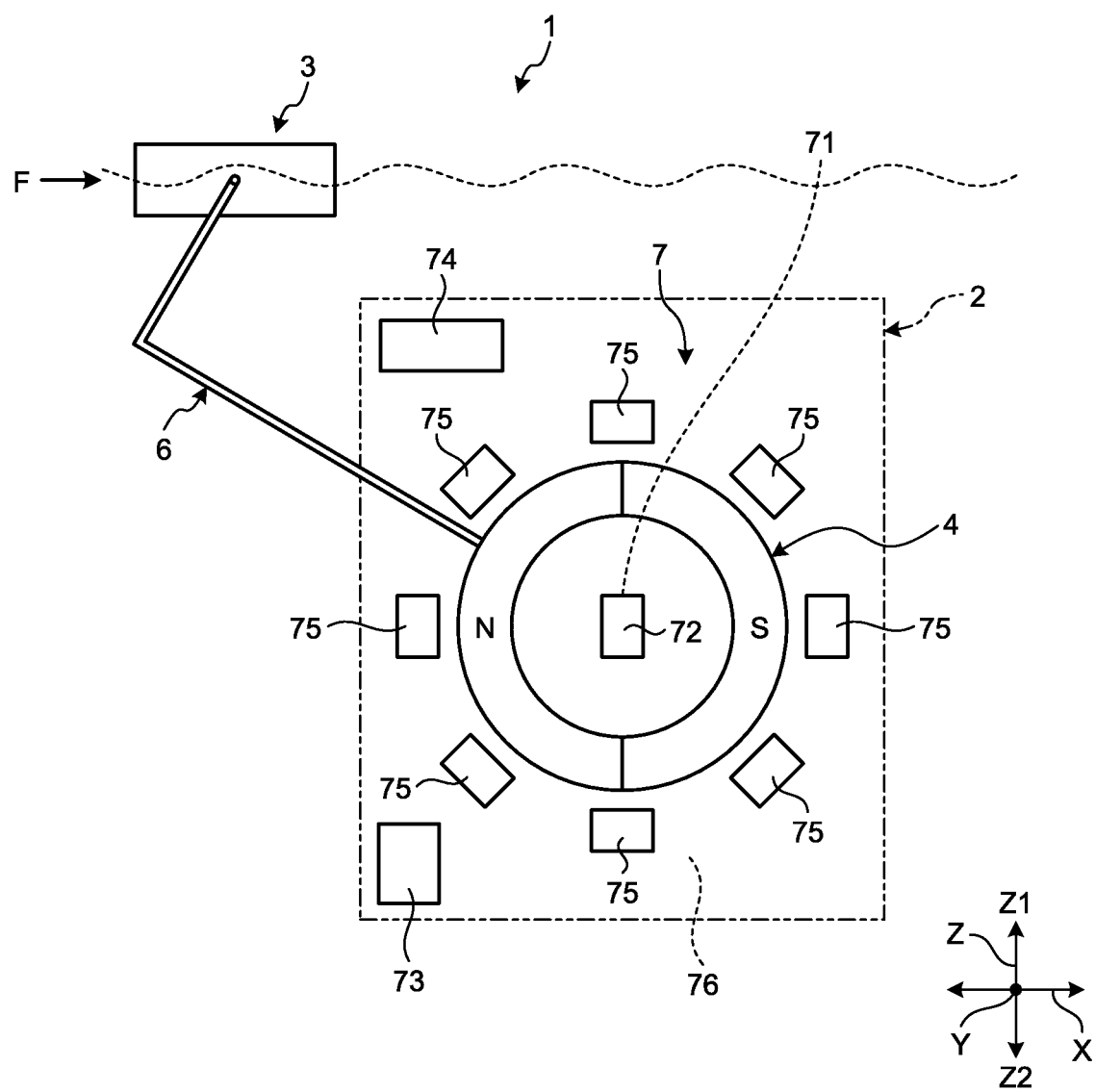
FIG. 3 is a diagram illustrating the liquid surface level sensor according to the embodiment.
Figure 4:
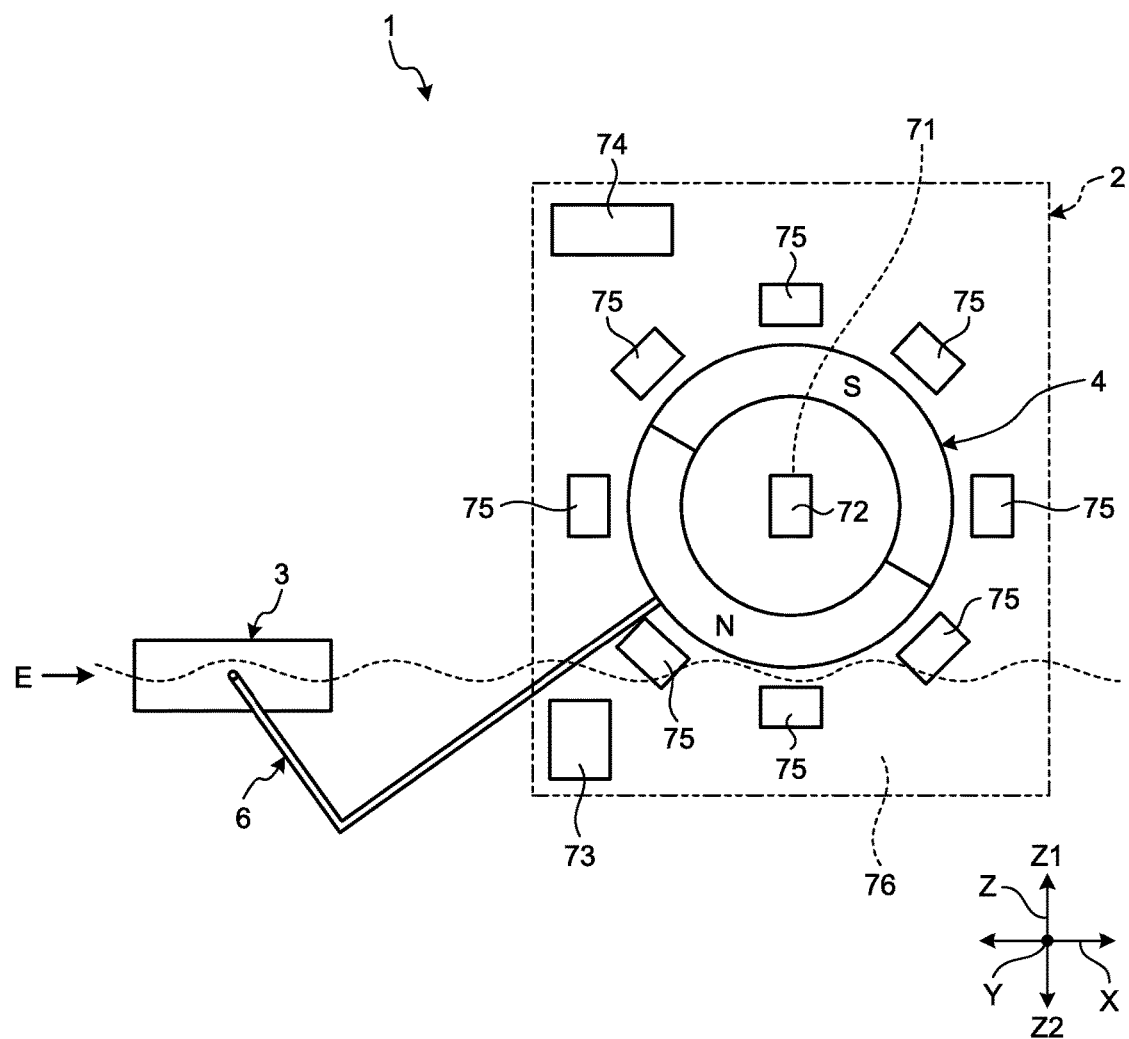
FIG. 4 is another diagram illustrating the liquid surface level sensor according to the embodiment.
Figure 5:
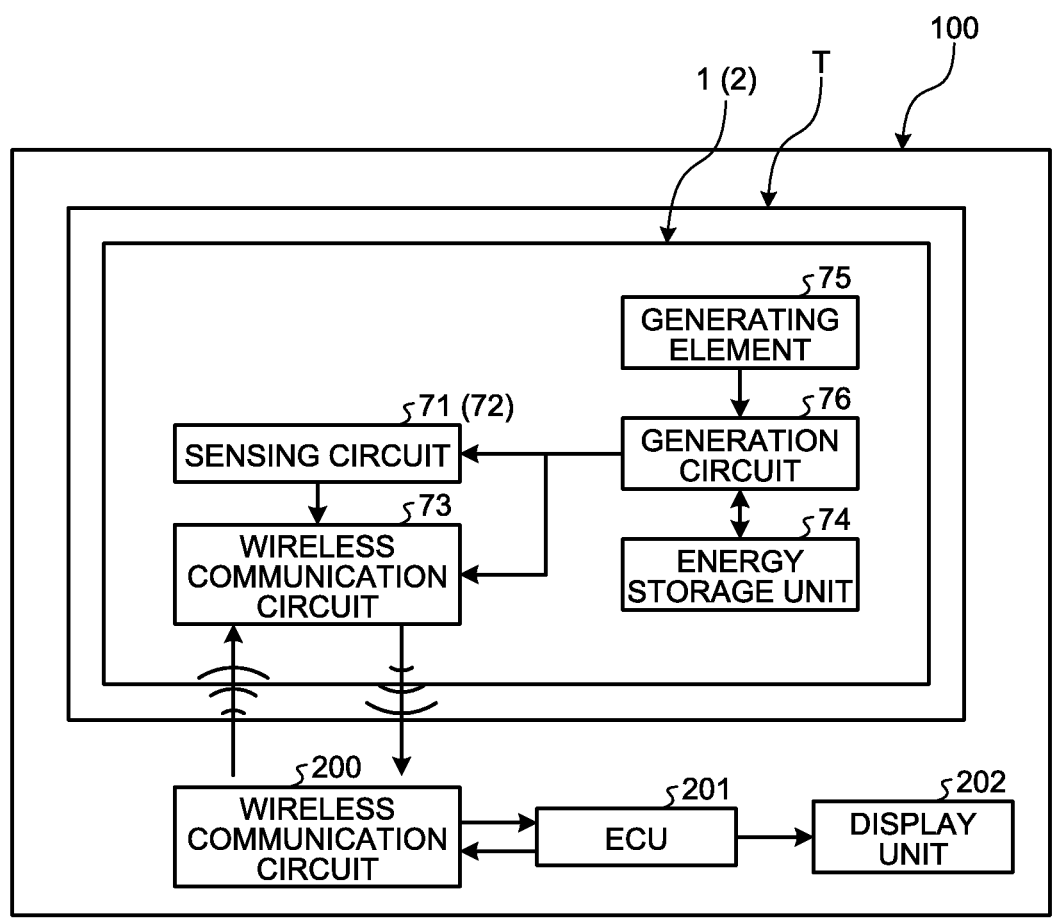
FIG. 5 is a block diagram illustrating the liquid surface level sensor according to the embodiment.

First, a liquid surface level sensor according to an embodiment of the present invention will be described. FIG. 1 is a schematic perspective view of the liquid surface level sensor according to the embodiment. FIG. 2 is a schematic exploded view of the liquid surface level sensor according to the embodiment. FIG. 3 is a diagram illustrating the liquid surface level sensor according to the embodiment. FIG. 4 is another diagram illustrating the liquid surface level sensor according to the embodiment. FIG. 5 is a block diagram illustrating the liquid surface level sensor according to the embodiment. The X direction in the drawings represents the width direction of a housing of the liquid surface level sensor. The Y direction in the drawings represents the depth direction of the housing of the liquid surface level sensor. The depth direction is orthogonal to the width direction. The depth direction corresponds to the axial direction of a magnet included in the liquid surface level sensor. The Z direction in the drawings represents the height direction of the housing of the liquid surface level sensor. The height direction is orthogonal to the width direction and the depth direction. The Z direction corresponds to the vertically upward and downward directions. The Z1 direction corresponds to the vertically upward direction. The Z2 direction corresponds to the vertically downward direction.

A liquid surface level sensor 1 is installed in a vehicle 100 and detects a liquid surface level of fuel in a fuel tank T, that is, detects a height level of the fuel surface in the fuel tank T. As illustrated in FIG. 1, the liquid surface level sensor 1 is disposed inside the fuel tank T. The liquid surface level sensor 1 outputs a detected fuel surface level to the outside of the fuel tank T. As illustrated in FIG. 5, the liquid surface level output to the outside of the fuel tank T is wirelessly transmitted to a wireless communication circuit 200 installed in the vehicle 100, and is displayed on a display unit 202 via an electronic control unit (ECU) 201 as a fuel residual amount. The liquid surface level sensor 1 includes a housing 2, a float 3, a magnet 4, a magnet supporting member 5, an arm 6, and a circuit unit 7.

The housing 2 is fixed to an inner portion of the fuel tank T and holds the magnet 4 and the circuit unit 7. The housing 2 is made of a nonmagnetic resin member. In the present embodiment, the housing 2 is made of polyphenylene sulfide (PPS). The housing 2 is formed by injection molding with the circuit unit 7 being an insert. The housing 2 has a substantially rectangular parallelepiped shape. One of two faces of the housing 2 facing each other in the depth direction is fixed to an inner portion of the fuel tank. T. The other one of the two faces of the housing 2 facing each other in the depth direction is formed with a recess portion 21 and a support portion 22.

The magnet 4 is mounted to the recess portion 21. The recess portion 21 is recessed in the depth direction from the outside to the inside of the housing 2. The recess portion 21 has an annular shape when seen in the depth direction. The outer diameter of the recess portion 21 is a little greater than that of the magnet 4. The support portion 22 is located in a position corresponding to a throughhole 41 of the magnet 4 described later when the magnet 4 is mounted to the recess portion 21. The support portion 22 is located in the center of the recess portion 21 when seen in the depth direction. The support portion 22 is circular when seen in the depth direction. The outer diameter of the support portion 22 is a little smaller than that of the throughhole 41 of the magnet 4.

The float 3 is buoyant in the fuel, and is located on the fuel surface due to the buoyancy. The float 3 moves up and down in accordance with the changes in the fuel surface in the fuel tank T when the fuel is added or consumed. The float 3 is made of, for example, synthetic resin and has a substantially rectangular parallelepiped shape. The float 3 has an insertion hole 31 into which the arm 6 is inserted, between two faces of the float 3 facing in the longitudinal direction. The insertion hole 31 passes through the float 3 from one face to the other face of the float 3 facing each other in the longitudinal direction.

The magnet 4 rotates in accordance with the up-and-down movement of the float 3 conveyed through the arm 6. The magnet 4 according to the present embodiment has an annular shape having the throughhole 41 and extends in the axial direction. The magnet 4 exhibits north and south polarities along the axial direction and generates magnetic flux therearound from the north pole to the south pole. The magnet 4 is rotatably mounted to the outside of the housing 2. The magnet 4 is mounted to the outside of the housing 2 with the axial direction corresponding to the depth direction of the housing 2. The magnet rotates relative to the housing 2 in the circumferential direction of the magnet 4.

The magnet supporting member 3 holds the magnet 4 by accommodating it therein, and the magnet 4 is fixed to the magnet supporting member 5. The magnet supporting member 3 is made of a non-magnetic resin member. In the present embodiment, the magnet supporting member 5 is made of PPS. The arm 6 is fixed to the magnet supporting member 5. Thus, the arm 6 rotates the magnet supporting member 5. Since the magnet 4 is fixed to the magnet supporting member 5, the magnet 4 rotates together with the magnet supporting member 5. The rotation of the magnet supporting member 5 is limited between the uppermost liquid surface level and the lowermost liquid surface level. In other words, the rotation of the magnet supporting member 5 is limited between a full tank and an empty tank.

The arm 6 converts the up-and-down movement of the float 3 that occurs in accordance with the changes in liquid surface level into rotation of the magnet 4. The arm 6 is, for example, a round bar metal such as a stainless steel bar, which is nonmagnetic. A first end 61 of the arm 6 is inserted into the insertion hole 31 of the float 3 and is joined with the float 3. The insertion hole 31 holds the arm 6 such that the arm 6 will not be removed therefrom. The insertion hole 31 holds the arm 6 such that the arm 6 can slide in its circumferential direction. That is, when vibrations of a moving vehicle vibrate the liquid surface and, accordingly, vibrate the float 3 in the width direction and the depth direction, the arm 6 slides in the circumferential direction in the insertion hole 31 to absorb the movement of the float 3. A second end 62 of the arm 6 is joined with the magnet 4. In other words, the second end 62 is fixed to the magnet supporting member 5.

The circuit unit 7 includes various circuits and elements mounted on a substrate. The circuit unit 7 detects a fuel surface level, and performs control and processing of supplying electric power and stopping supplying electric power to the circuits and elements. The circuit unit 7 is included inside the housing 2 in a state isolated from the outside of the housing 2, that is, isolated from the outside of the fuel tank T. The circuit unfit 7 includes a sensing circuit 71, a sensing element 72, a wireless communication circuit 73, an electric storage unit 74, generating elements 75, and a generation circuit 76, and includes a switch and an electronic device that performs control, which are not illustrated. The switch and the electronic device that performs control, which are not illustrated, are used when the circuit unit 7 performs control and processing of supplying electric power and stopping supplying electric power to the circuits and the elements.

The sensing circuit 71 includes the sensing element 72. The sensing circuit 71 outputs a voltage that is an electric signal output from the sensing element 72 as a liquid surface level to the wireless communication circuit 73. The sensing circuit 71 includes a conductor, which is not illustrated, that electrically connects the sensing element 72 with the wireless communication circuit 73. The conductor, which is not illustrated, is made of a conductive metal plate.

The sensing element 72 according to the present embodiment is a Hall element 72. The Hall element 72 outputs an electric signal based on the rotation angle of the magnet 4. The Hall element 72 is located in the center of the magnet 4, that is, in the center of the throughhole 41 of the magnet 4 mounted to the housing 2.

The Hall element 72 detects, from the magnetic flux of the magnet 4, the rotation angle of the magnet 4 that rotates in accordance with the changes in the liquid surface level in the present embodiment. The generating elements (generating coils) 75 described later supply drive electric power, that is, an electric current (drive current) to the Hall element 72. The magnetic flux of the magnet 4 acts on the Hall element 72. The direction in which the electric current flows is perpendicular to the direction of the magnetic flux of the magnet 4. When the magnetic flux perpendicularly acts on the electric current flowing in the Hall element 72, a voltage difference, that is, a voltage (the Hall voltage) is produced in a direction perpendicular to the directions of the electric current and the magnetic flux. The voltage value corresponds to the magnetic density that acts on the Hall element 72. In other words, as the magnet 4 rotates, the magnetic density that acts on the Hall element 72 changes in accordance with the rotation angle of the magnet 4. Thus, the rotation angle of the magnet 4 can be determined from the voltage value output from the Hall element 72. The Hall element 72 is disposed inside the support portion 22 of the housing 2.

The wireless communication circuit 73 transmits the liquid surface level detected by the sensing circuit 71, that is, a voltage output from the Hall element 72 to the wireless communication circuit 200 disposed external to the fuel tank T. The wireless communication circuit 73 includes an antenna, which is not illustrated, for wireless communication.

The electric storage unit 74 according to the present embodiment is a capacitor 74. The capacitor 74 stores therein electric power generated by the generating elements 75, which is generated in accordance with the changes in liquid surface level, in accordance with the state of the vehicle 100. The capacitor 74 releases electric power stored therein in accordance with the state of the vehicle 100 to the generation circuit 76. The capacitor 74 is electrically connected to the generating coils 75 via the generation circuit 76.

The generating elements 75 according to the present embodiment are generating coils 75. The generating coils 75 are disposed in the magnetic field produced by the magnet 4. The magnet 4 rotates in accordance with the up-and-down movement of the float 3 (liquid surface) as described above. This rotation changes the magnetic flux that passes through the generating coils 75, thereby inducing electromotive force in the generating coils 75. In other words, the generating coils 75 generate electric power from the rotation of the magnet 4. The generating coils 75 are each formed by a conductive metallic wire such as copper wire that is coaxially wound a plurality of times. The generating coils 75 are arranged close to and around the outer circumference of the magnet 4 mounted to the housing 2.

The generation circuit 76 supplies electric power generated by the generating coils 75 while the vehicle is moving to the sensing circuit 71, that is, to the Hall element 72 and to the wireless communication circuit 73. The generation circuit 76 supplies the electric power generated by the generating coils 75 while the vehicle is moving to the capacitor 74. The generation circuit 76 supplies the electric power stored in the capacitor 74 to the sensing circuit 71, that is, to the Hall element 72 and to the wireless communication circuit 73 in accordance with the generation state of the generating coils 75. When the vehicle 100 stops, the generation circuit 76 limits electric power supply from the capacitor 74 to the sensing circuit 71, that is, to the Hall element 72 and to the wireless communication circuit 73 in accordance with stop information received by the wireless communication circuit 73. The generation circuit 76 includes conductors, which are not illustrated, that electrically connect the generating coils 75 with the sensing circuit 71, that is, with the Hall element 72. The generation circuit 76 includes conductors, which are not illustrated, that electrically connect the generating coils 75 with the capacitor 74. The conductors, which are not illustrated, are each made of a conductive metal plate. The switch and the electronic device, which are not illustrated, for use in control and processing of supplying electric power and stopping supplying electric power to the circuits and the elements are mounted on the generation circuit 76.

As illustrated in FIG. 5, the wireless communication circuit 200 of the vehicle 100, the ECU 201, and the display unit 202 are disposed external to the fuel tank T. The wireless communication circuit 200 of the vehicle 100 is the destination of information transmitted from the wireless communication circuit 73 included in the liquid surface level sensor 1 described later. The wireless communication circuit 200 of the vehicle 100 transmits and receives various types of information such as a liquid surface level detected by the circuit unit 7 received from the wireless communication circuit 73. The wireless communication circuit 200 of the vehicle 100 includes an antenna, which is not illustrated, for wireless communication. The ECU 201 performs control and processing based on various types of information. The ECU 201 converts the electric signal based on the rotation angle of the magnet 4 transmitted from the liquid surface level sensor 1 via the wireless communication circuit 200 of the vehicle 100 into a fuel residual amount in the fuel tank T. The display unit 202 displays the height level of the liquid surface in the fuel tank T, which is converted by the ECU 201, as the fuel residual amount. The display unit 202 according to the present embodiment is disposed in the instrument panel in the vehicle cabin.

Described next is an example of a method of manufacturing the liquid surface level sensor 1. First, a worker performs injection molding to form the housing 2 with the circuit unit 7 being an insert. With this operation, the circuit unit 7 is included inside the housing 2 in a state isolated from the outside of the housing 2. The worker then inserts the first end 61 of the arm 6 into the insertion hole 31 of the float 3 to join the arm 6 with the float 3. Subsequently, the worker fixes the second end 62 of the arm 6 to the magnet supporting member 5 to which the magnet 4 is fixed. This operation joins the arm 6 with the magnet 4 and the magnet supporting member 5 in a fixed state. The worker then mounts the magnet supporting member 5 to which the magnet 4 is fixed to the recess portion 21 of the housing 2, and the procedure of manufacturing the liquid surface level sensor 1 is ended. The worker sets and fixes the housing 2 of the liquid surface level sensor 1 to an inner portion of the fuel tank T.

Described next are operations of the liquid surface level sensor 1 according to the present embodiment with reference to FIGS. 3 to 5. First, detection of the liquid surface level by the liquid surface level sensor 1 will be described. As illustrated in FIG. 3, the liquid surface and the float 3 are at an F position located vertically upward relative to the housing 2 when the fuel tank T is full or nearly full. As the fuel is consumed by the vehicle 100 as the vehicle 100 moves, for example, the liquid surface and the float 3 move from the F position toward an E position located vertically downward relative to the housing 2, as illustrated in FIG. 4. As the float 3 moves toward the E position, the magnet 4 rotates in the circumferential direction. In other words, the magnet 4 rotates counterclockwise in accordance with the movement of the liquid surface and the float 3 from the F position toward the E position. The positions of the north and the south poles of the magnet 4 relative to the Hall element 72 are changed in accordance with the rotation of the magnet 4, and the magnetic density created by the magnet 4 is changed. The Hall element 72 outputs, in accordance with the rotation of the magnet 4, a voltage corresponding to the rotation angle of the magnet 4. Voltage information corresponding to the rotation angle of the magnet 4 output by the Hall element 72 passes through the sensing circuit 71, and is wirelessly transmitted from the wireless communication circuit 73 to the wireless communication circuit 200 of the vehicle 100. The voltage information is converted by the ECU 201 into a liquid surface level and continuously displayed on the display unit 202 as a fuel residual amount.

Described next is generation of electric power by the generating coils 75 of the liquid surface level sensor 1. The liquid surface moves from the F position toward the E position with small alternating up-and-down movements. The small alternating up-and-down movements of the liquid surface cause the float 3 to perform small alternating up-and-down movements in accordance with the alternating up-and-down movements, the magnet 4 rotates clockwise and counterclockwise alternately. The positions of the north and the south poles of the magnet 4 relative to the generating coils 75 are changed continually with the alternate rotations of the magnet 4, and the magnetic flux that passes through the generating coils 75 is changed continually. The change in the magnetic flux of the magnet 4 induces electromotive force in the generating coils 75. Thus, when the magnetic flux of the magnet 4 changes continually, the generating coils 75 continuously generate the induced electromotive force. The induced electromotive force is supplied through the generation circuit 76 to the sensing circuit 71 including the Hall element 72 and to the wireless communication circuit 73. This configuration continuously supplies the electric power generated by the generating coils 75 to the Hall element 72 as drive electric power, and the Hall element 72 detects a voltage corresponding to the rotation angle of the magnet 4. The electric power generated by the generating coils 75 is continuously supplied to the wireless communication circuit 73 as drive electric power, and the wireless communication circuit 73 transmits and receives various types of information to and from the wireless communication circuit 200 of the vehicle 100.

The generation circuit 76 includes an electronic device, which is not illustrated, that monitors the generation state of the generating coils 75, that is, monitors an electric power value generated by the generating coils 75. If the generation circuit 76 determines that the electric power value generated by the generating coils 75 is greater than the drive electric power of the sensing circuit 71 and the wireless communication circuit 73, the circuit unit 7 supplies the electric power generated by the generating coils 75 to the sensing circuit 71 and the wireless communication circuit 73, and stores the excessive electric power above the drive electric power in the capacitor 74 via the generation circuit 76.

The electric power stored in the capacitor 74 is supplied to the sensing circuit 71 and the wireless communication circuit 73 as the drive electric power in accordance with the generation state of the generating coils 75. Described herein is a generation state of the generating coils 75 when the vehicle 100 stops idling and thus the movement of the liquid surface is subtle. In this state, the movement of the liquid surface is subtle, and the generation circuit 76 determines that the electric power value generated by the venerating coils 75 is not sufficient for the drive electric power of the sensing circuit 71 and the wireless communication circuit 73, or determines that the electric power value is very close to zero and that no electric power is generated by the generating coils 75. Accordingly, the generation circuit 76 turns the switch, which is not illustrated, to supply electric power stored in the capacitor 74 to the sensing circuit 71 and the wireless communication circuit 73. The electric power stored in the capacitor 74 is supplied to the sensing circuit 71 and the wireless communication circuit 73 until when the liquid surface moves again upon starting of the vehicle 100 and the generating coils 75 start generating electric power, and when the electric power value generated by the generating coils 75 reaches a drive electric power value for driving the sensing circuit 71 and the wireless communication circuit 73. When the generation circuit 76 determines that the electric power value generated by the generating coils 75 reaches the drive electric power value of the sensing circuit 71 and the wireless communication circuit 73, the generation circuit 76 turns the switch, which is not illustrated, to supply electric power generated by the generating coils 75 to the sensing circuit 71 and the wireless communication circuit 73.

The housing 2 of the liquid surface level sensor 1 according to the present embodiment is fixed to an inner portion of the fuel tank T. The magnet 4 mounted to the outside of the housing 2 rotates in accordance with the up-and-down movement of the float 3, and the Hall element 72 of the circuit unit 7 detects a voltage as a liquid surface level. The detected liquid surface level is wirelessly transmitted from the wireless communication circuit 73 of the circuit unit 7 to the wireless communication circuit 200 of the vehicle 100. The circuit unit 7 includes a plurality of generating coils 75. The rotation of the magnet 4 induces electromotive force in the generating coils 75, and the induced electromotive force is supplied to the Hall element 72 and the wireless communication circuit 73 as drive electric power. In the conventional technology, for example, the drive electric power is supplied to the Hall element 72 and the wireless communication circuit 73 from a power source disposed external to the fuel tank T of the liquid surface level sensor. This configuration requires a wire routed from the outside to the inside of the housing 2 to supply the drive electric power. When the liquid surface level is output to the ECU 201 or other devices installed in the vehicle 100 via a wire as in the conventional technology, a communication line for transmitting information about the liquid surface level is routed from the outside to the inside of the housing 2. In the liquid surface level sensor 1 according to the present embodiment, the drive electric power is supplied to the Hall element 72 and the wireless communication circuit 73 by using electric power generated by the generating coils 75. Moreover, the liquid surface level is wirelessly output to the ECU 201 or other devices installed in the vehicle 100 by the wireless communication circuit 73. In the configuration above, the circuit unit 7 of the liquid surface level sensor 1 is included inside the housing 2 such that the housing 2 isolates the circuit unit 7 from the outside, thereby eliminating the need for wires that are routed from the outside to the inside of the housing 2. With this configuration, in the liquid surface level sensor 1, the fuel will not enter the housing 2 and will not adhere to circuits and elements in the housing 2, thereby preventing adverse effects to the circuits and elements.

The liquid surface level sensor 1 supplies the drive electric power of the Hall element 72 and the wireless communication circuit 73 by using the electromotive force induced in the generating coils 75 by the rotation of the magnet 4. In other words, the liquid surface level sensor 1 generates the drive electric power by using the rotation of the magnet 4 that inevitably occurs in detecting the liquid surface level. This configuration can reduce electric power consumption compared with a case in which the drive electric power is supplied from an external power source.

When the liquid surface is vibrating significantly in a moving vehicle, the magnet 4 of the liquid surface level sensor 1 rotates in a vibrating manner and the magnetic flux that passes through the generating coils 75 frequently changes in a short period of time. This situation increases a value of induced electromotive force in the generating coils 75. In other words, more rotational energy is converted into electric power by the generating coils 75. When the liquid surface is vibrating significantly, more rotational energy produced by the rotation of the magnet 4 is converted into electric power by the generating coils 75, which increases torque in the directions of the rotation. The increased torque reduces the vibrations of the rotating magnet 4, and friction between the housing 2 and the magnet supporting member 5 can be reduced in the liquid surface level sensor 1.

The liquid surface level sensor 1 according to the present embodiment includes the capacitor 74. The capacitor 74 stores therein electric power generated by the generating coils 75 and supplies the stored electric power to the Hall element 72 and the wireless communication circuit 73 in accordance with the generation state of the generating coils 75. This configuration enables the liquid surface level sensor 1 to detect the liquid surface level even when, for example, the liquid surface does not move while the vehicle is stopping for a short time, when the generating coils 75 generate no electric power immediately after starting of the vehicle 100, or when the electric power value generated by the generating coils 75 is not sufficient for the drive electric power value of the sensing circuit 71 and the wireless communication circuit 73.

Modification

Described next is a liquid surface level sensor 1 according to a modification. The liquid surface level sensor 1 according to the modification differs from the embodiment above in that the ECU 201 transmits stop information of the vehicle 100 based on a stopping state of the vehicle 100 to the circuit unit 7 of the liquid surface level sensor 1 via the wireless communication circuits 200 and 73. In other words, the modification differs from the embodiment above in that the wireless communication circuit 73 receives the stop information of the vehicle 100 from the ECU 201 via the wireless communication circuit 200 of the vehicle 100 when the vehicle 100 stops. Other configurations, functions, and effects similar to those of the liquid surface level sensor 1 according to the embodiment above will not be described again as much as possible.

Described below is an operation of the liquid surface level sensor 1 according to the modification with reference to FIGS. 3 to 5. Detection of the liquid surface level by the liquid surface level sensor 1 and generation of electric power by the generating coils 75 according to the modification are the same as those in the embodiment above.

If the ECU 201 installed in the vehicle 100 determines, for example, that the vehicle 100 is in an ignition-off state and will be stopping for a long time, the stop information is transmitted to the wireless communication circuit 73 of the liquid surface level sensor 1. In the liquid level surface sensor 1, as described in the embodiment above, when the generation circuit 76 determines that the electric power value generated by the generating coils 75 is not sufficient for the drive electric power value of the sensing circuit 71 and the wireless communication circuit 73, the source of electric power supply to the sensing circuit 71 and the wireless communication circuit 73 is changed from the generating coils 75 to the capacitor 74. Upon transmission of the stop information to the wireless communication circuit 73, the generation circuit 76 limits the electric power supply from the capacitor 74 to the sensing circuit 71 and the wireless communication circuit 73. In the present modification, the generation circuit 76 transitions to a sleep mode when the wireless communication circuit 200 transmits the stop information to the wireless communication circuit 73. In the sleep mode according to the present modification, the wireless communication circuit 73 and the generation circuit 76 perform a minimum operation for future reactivation. The generation circuit 76 that has transitioned to the sleep mode limits the electric power supply from the capacitor 74 to the sensing circuit 71 and the wireless communication circuit 73. Considering the possibility that the vehicle 100 is stopping for a long time, that is, the vehicle 100 is in an ignition-off state because the vehicle 100 is refueling, the generation circuit 76 is configured to change the electric power supply scheme to the sensing circuit 71 to an intermittent drive, and gradually increase the intervals of the intermittent drive, and ultimately stop supplying electric power to the sensing circuit 71. Alternatively, when the wireless communication circuit 200 transmits the stop information to the wireless communication circuit 73, the generation circuit 76 may continue supplying electric power to the sensing circuit 71 as long as an electronic device, which is not illustrated, in the generation circuit 76 detects movements of the liquid surface in the fuel tank T, and may stop supplying electric power to the sensing circuit 71 if the electronic device, which is not illustrated, detects no movement of the liquid surface because the vehicle 100 has been stopping for a long time. When, for example, the vehicle 100 is turned to an ignition-on state and is restarted after a long-term stopping state, and when the vibrations of the vehicle 100 move the liquid surface, the generation circuit 76 restarts the electric power supply and transitions to an ordinary measuring mode. Alternatively, the generation circuit 76 transitions from the sleep mode to the ordinary measuring mode when the wireless communication circuit 73 receives a restart signal of the vehicle 100. In other words, the electric power stored in the capacitor 74 is supplied to the sensing circuit 71 and the wireless communication circuit 73 until when the vehicle 100 moves again and the vibrations of the vehicle 100 move the liquid surface, and when the electric power value generated by the generating elements 75 reaches the drive electric power value of the sensing circuit 71 and the wireless communication circuit 73. When the generation circuit 76 determines that the electric power value generated by the generating elements 75 reaches the drive electric power value of the sensing circuit 71 and the wireless communication circuit 73, the generation circuit 76 supplies electric power generated by the generating elements 75 to the sensing circuit 71 and the wireless communication circuit 73.

When the ECU 201 detects a stopping state of the vehicle 100, the wireless communication circuit 73 of the liquid surface level sensor 1 according to the modification receives the stop information of the vehicle 100 from the wireless communication circuit 200 of the vehicle 100. When the wireless communication circuit 73 receives the stop information, which is transmitted when, for example, the vehicle 100 is expected to be stopping for a long time, the generation circuit 76 limits the electric power supply from the capacitor 74 to the Hall element 72 and the wireless communication circuit 73 to a minimum electric power supply needed for future reactivation. Accordingly, the generation circuit 76 can prevent wasting of electric power stored in the capacitor 74.

Although the sensing element 72 according to the embodiment above is described as the Hall element 72, the sensing element 72 is not limited to this. The sensing element 72 may be any magnetic sensing element such as a giant magneto-resistive effect (GMR) element. Two magnetic sensing elements may be packed for use as the sensing element 72.

Although the generating elements 75 according to the embodiment above are described as the generating coils 75, the generating elements 75 are not limited to this. The generating elements 75 may be any elements that can generate electric power from magnetic variations provided by the rotation of the magnet 4.

Although the generating coils 75 according to the embodiment above are disposed close to the outer circumference of the magnet 4, the positions of the generating coils 75 are not limited to this. For example, the generating coils 75 may be disposed in the throughhole 41 of the magnet 4 and close to the inner circumference of the magnet 4.

Although the magnet 4 according to the embodiment above has an annular shape, the shape of the magnet 4 is not limited to this. For example, the magnet 4 may have a rectangular external shape.

The liquid surface level sensor according to the present embodiment includes generating elements that generate electric power from rotation of the magnet, and a circuit unit having a wireless communication circuit. The circuit unit is included inside a housing in a state isolated from the outside, and will not be adversely affected by fuel.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A liquid surface level sensor comprising:
a housing disposed inside a container that stores liquid in the container;
a float located on a liquid surface of the liquid due to buoyancy;
a magnet rotatably mounted outside the housing;
an arm having a first end and a second end, the first end being joined with the float, the second end being joined with the magnet, the arm converting up-and-down movement of the float that occurs in accordance with a change in the liquid surface into rotation of the magnet; and
a circuit unit included inside the housing in a state isolated from the outside, the circuit unit being configured to detect a liquid surface level of the liquid, wherein
the circuit unit includes
 a generating element that generates electric power based on a change in magnetic flux caused by the rotation of the magnet in accordance with the change in the liquid surface,
 a sensing circuit including a sensing element that outputs an electric signal based on a rotation angle of the magnet in the rotation of the magnet in accordance with the change in the liquid surface, the sensing circuit detecting the electric signal output from the sensing element as the liquid surface level,
 a wireless communication circuit that transmits the liquid surface level detected by the sensing circuit to a transmission target external to the container by wireless communication, and
 a generation circuit that supplies electric power generated by the generating element to the sensing circuit and the wireless communication circuit.

2. The liquid surface level sensor according to claim 1, wherein
the circuit unit includes an electric storage unit electrically connected to the generating element via the generation circuit,
the electric storage unit stores electric power generated by the generating element in accordance with the change in the liquid surface, and
the generation circuit supplies the electric power stored in the electric storage unit to the sensing circuit and the wireless communication circuit in accordance with a generation state of the generating element.

3. The liquid surface level sensor according to claim 2, wherein
the liquid surface level sensor is installed in a vehicle,
the wireless communication circuit receives stop information relating to a stopping state of the vehicle from the transmission target, and
the generation circuit limits electric power supply from the electric storage unit to the sensing circuit and the wireless communication circuit in accordance with the stop information received by the wireless communication circuit.

\* \* \* \* \*